W. B. CROSSLAND.
SPEED ALARM.
APPLICATION FILED MAR. 31, 1915.
1,188,252.
Patented June 20, 1916.
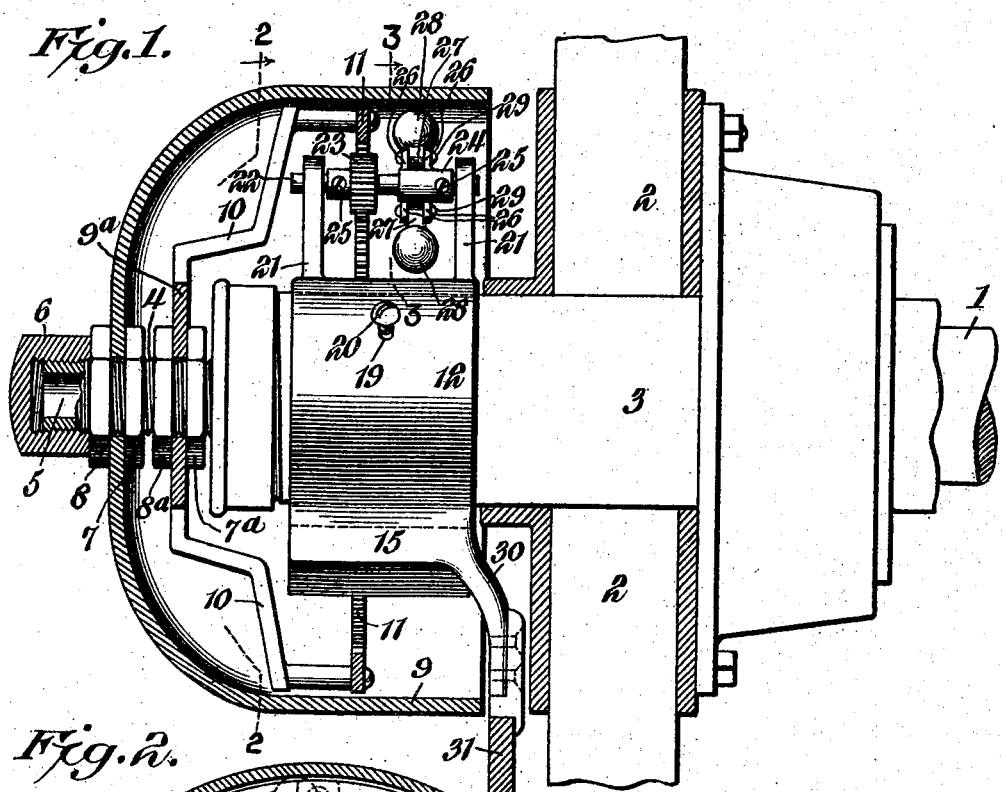
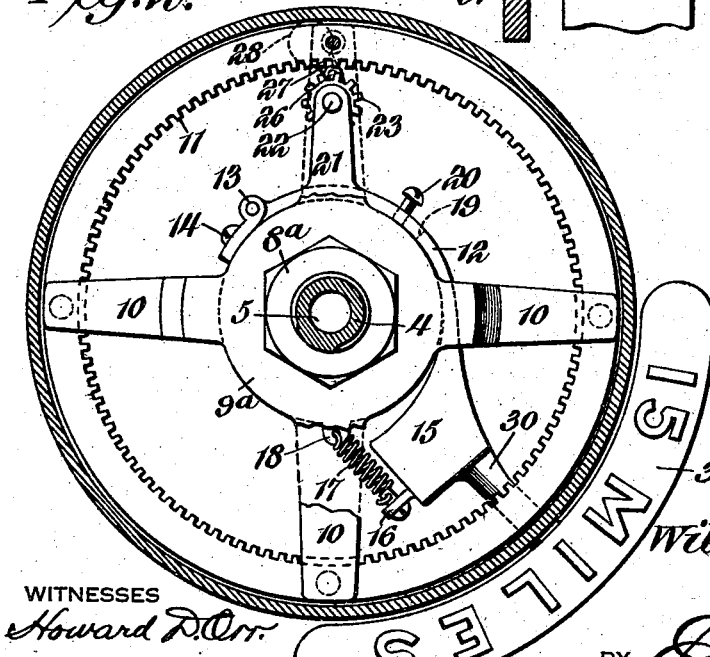
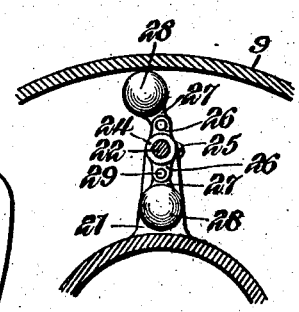
WITNESSES
Howard D. Orr.
H. T. Chapman.
William B. Crossland,
INVENTOR,
BY E. G. Siggers.
ATTORNEY

UNITED STATES PATENT OFFICE.

WILLIAM BLACKWELL CROSSLAND, OF NEWPORT, ARKANSAS.

SPEED-ALARM.

1,188,252.  Specification of Letters Patent.  Patented June 20, 1916.

Application filed March 31, 1915. Serial No. 18,315.

*To all whom it may concern:*

Be it known that I, WILLIAM B. CROSSLAND, a citizen of the United States, residing at Newport, in the county of Jackson and State of Arkansas, have invented a new and useful Speed-Alarm, of which the following is a specification.

This invention has reference to speed alarms and its object is to provide means whereby an alarm is sounded when the speed attained shall exceed a predetermined limit.

The speed alarm of the present invention is designed more particularly for use in connection with automobiles, although it is not limited in its usefulness to such particular structures.

When used in connection with an automobile the alarm device is so placed that the sound produced is not muffled by interfering parts of the vehicle, but will give a particularly obtrusive sound thereby attracting the attention of observers, and also the attention of the occupants of the vehicle.

The present invention comprises a sound giving structure which may be attached to the axle of one of the wheels of the vehicle, and is usually associated with one of the front wheels. At the end of the axle which may have a suitably threaded prolongation there is attached a gong and within the gong there is applied a circular rack bar, both the gong and rack bar being held by the axle against rotative movements.

Mounted on the wheel hub so as to rotate and located within the gong is a centrifugally responsive member carrying a pinion which is attached to tappets so related to the gong that on the attainment of a predetermined limit of speed the centrifugal member is so acted upon by centrifugal force as to move away from the axis of rotation sufficiently to carry the pinion into mesh with the rack bar, thereby imparting rapid rotative movement to the tappets, and the latter then strike the gong in rapid succession to thereby produce the alarm.

The whole structure is of simple nature, readily applied to the automobile, and, moreover, is susceptible of adjustment to respond on the attainment of different speeds, wherefore it is within the power of the driver of the vehicle to arrange the alarm so that a determined speed limit when reached will notify the driver of such fact and prevent unintentionally exceeding such limit.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is a longitudinal diametric section through a portion of the speed alarm as attached to a vehicle axle with some parts shown in elevation. Fig. 2 is a section on the line 2—2 of Fig. 1, some distant parts being omitted. Fig. 3 is a section on the line 3—3 of Fig. 1, distant parts being omitted.

Referring to the drawings there is shown an axle 1, a wheel 2 having a hub portion 3, and a threaded stem 4 projecting axially from the outer end of the axle, such threaded stem being hollow, as indicated at 5, and provided with a cap nut 6, whereby the hollow exteriorly threaded stem may be utilized for the introduction of lubricant to the axle where carrying the wheel hub. On the stem 4 is a lock nut 7 and a clamp nut 8 and between these nuts there is mounted an axially elongated bell or gong 9, which for a portion of its length may be tubular, but the particular structure of the bell is not obligatory although a tubular form of bell or gong is advantageous in providing a housing for certain structures to be described.

Mounted upon the threaded stem 4 within the gong is a spider 9ª secured to the stem by stop and lock nuts 7ª and 8ª, respectively. The spider 9ª has arms 10 which at their outer ends carry a circular rack 11 with interior teeth. The spider arms 10 are so bent that the rack is in surrounding relation to a portion of the hub 3.

Mounted upon and partly encircling the hub 3 is a curved plate 12 which at one end is connected to the hub 3 by a hinge 13 attached to the hub by screws 14 or otherwise. That end of the plate 12 remote from the hinge 14 is enlarged, as shown at 15, to provide a weight which may be located about diametrically opposite from the hinge 13, although the exact location of the parts is not obligatory. On the weight 15 is an eye 16 to which is attached one end of a spring 17, the other end being attached to an eye 18 on or secured to the hub 3. The arrangement is such that upon the rotation of the wheel the action of centrifugal force upon the weight 15 tends to move this weight about the hinge 13 in a direction away from the hub 3, but this centrifugal tendency is opposed by the spring 17. In practice the spring or springs 17, since of course the springs may be multiplied, are of sufficient power to resist the action of centrifugal force on the weight 15 until the speed of the vehicle wheel is such as to correspond with a progressive speed of the vehicle determining the limit of speed at which it is desired the alarm should operate.

The plate 12 has a slot 19 therein at any convenient point traversed by a headed pin or screw 20, so that when the plate is moved about the hinge 13 under the action of centrifugal force such movement is limited by the engagement of the plate with the head of the screw or pin 20. The plate adjacent to the hinge 13 has arms 21 thereon which may be in substantially radial relation to the curvature of the plate. At the outer ends of these arms there is journaled a shaft 22 extending between the arms and carrying a pinion 23 and a hub 24 made fast to the shaft in any appropriate manner as by screws 25. The pinion 23 is so located that on the movement of the plate 12 about the hinge 13 in the direction away from the hub the pinion is brought into mesh with the teeth of the rack bar 11. The hub 24 on the shaft 22 has pairs of ears 26 thereon and between these pairs of ears are secured eyes 27 on tappets 28, the eyes 27 being connected to the ears 26 by pivot pins 29. Usually the tappets are arranged on diametrically opposite sides of the hub 24, but a single tappet or more than two may be employed as may be desired.

Projecting from the weight 15 is an arm 30 which may extend beyond that end of the bell 9 remote from the stem 4. This arm 30 is designed to receive an additional weight 31 which may be in the form of a curved plate conforming to the curvature of the bell 9 and may have suitable words or other indications thereon so that with the weight 31 applied the speed limit at which the alarm will sound is indicated.

The speed alarm of the present invention is not at all unsightly and may replace the dust cap on the wheel. Such exchange is not particularly noticeable since the bell or gong 9 hides the operating mechanism and may quite nearly resemble in appearance a dust cap.

So long as the speed is below the predetermined limit the tappets 28 cannot reach the gong 9 even though they be subjected to centrifugal force exerted by the rotation of the hub 3 and the parts carried thereby. When however the centrifugal force is sufficiently strong to overcome the spring or springs 17, the pinion 23 is brought into engagement with the rack bar 11 and a rapid rotative movement is imparted to the tappets which at the same time have been moved closer to the bell, and they strike the bell a rapid succession of blows causing the bell to sound vigorously, so that observers exterior to the vehicle and the occupants of the vehicle are both apprised with the speed limit has been reached and that there is danger of exceeding the speed limit.

With the extra weight 31 applied the structure becomes responsive to a lower speed than when the weight 31 is omitted. The bell 9 performs the function of a casing for the moving parts and may be even constructed so that it will produce a disagreeable noise under the action of the tappets instead of a musical tone such as is usually produced by a bell.

What is claimed is:—

1. An alarm device for a rotatable structure, comprising a casing having means for holding it against rotation with the rotatable structure, a rack located within the casing and provided with means for holding it against rotation with the rotatable structure, a centrifugal member rotatable with the rotatable structure and located within the casing, and a pinion and tappets connected thereto and carried by the centrifugal member for movement by the latter to bring the pinion into mesh with the rack and the tappets into operative relation to the casing on the attainment of a predetermined speed of rotation of the rotatable structure.

2. An alarm for vehicles comprising a casing constituting a sounding member and adapted to be attached to the axle of a vehicle, a circular rack bar also adapted to be attached to the axle of the vehicle within the casing, a member adapted to be attached to a rotatable portion of a wheel mounted on the axle and responsive to centrifugal force on the attainment of a predetermined speed of rotation by the wheel, a pinion mounted on the centrifugally responsive member and participating in the movements thereon, and a tappet structure connected to the pinion for rotation therewith and movable with the centrifugal member into striking distance of the sounding member.

3. A speed alarm for vehicles comprising a hollow sounding member, a centrifugal member lodged within the sounding member, rotatable tappets carried by and participating in the centrifugal movements of the centrifugal member into and out of operative relation to the sounding member, and means controlled by the centrifugal member for causing rotation of the tappets when moved into operative relation to the sounding member.

4. A speed alarm for vehicles comprising a sounding member in the form of a casing, a fixed actuating member inclosed in the sounding member, a centrifugal member inclosed in the sounding member, rotatable means carried by and participating in the centrifugal movements of the centrifugal member into engagement with the actuating member, and a tappet structure connected to the rotatable member for actuation thereby and movable by the centrifugal member into operative relation to the sounding member when the rotatable member is in engagement with the actuating member.

5. A speed alarm for automobiles comprising an elongated bell-shaped casing adapted to be attached to the axle of an automobile, a circular rack bar adapted to be attached to the axle and lodged within the casing, a centrifugal member adapted to be attached to the hub of a wheel mounted on the axle, and constructed to move under the action of centrifugal force on the attainment of a predetermined speed, a pinion carried by the centrifugal member and movable thereby into engagement with the rack bar, and a tappet structure connected to the pinion for actuation thereby and movable by the centrifugal member into operative relation to the bell.

6. A speed alarm for automobiles comprising an elongated bell-shaped casing adapted to be attached to the axle of an automobile, a circular rack bar adapted to be attached to the axle and lodged within the casing, a centrifugal member adapted to be attached to the hub of a wheel mounted on the axle, and constructed to move under the action of centrifugal force on the attainment of a predetermined speed, a pinion carried by the centrifugal member and movable thereby into engagement with the rack bar, and a tappet structure connected to the pinion for actuation thereby and movable by the centrifugal member into operative relation to the bell, said bell being of a length to house the rack bar, the centrifugal member and parts carried thereby, and said centrifugal member having means for the attachment of an additional weight thereto.

7. A speed alarm for automobiles comprising an elongated bell-shaped casing adapted to be attached to the outer end of an axle of an automobile, a circular rack bar and a support therefor adapted to be attached to the axle interior to the casing, a weight member provided with a hinge connection for attachment to the hub of a wheel mounted on the axle and also provided with a spring connection to the hub at a point remote from the hinge connection, a shaft carried by the weighted member adjacent to the hinge, a pinion and rotatable tappets carried by and fast to the shaft with the pinion movable into and out of engagement with the rack bar, and the tappets into and out of operative relation to the casing by movements of the weighted member, and means for the attachment of an additional weight to the weighted member.

8. In a speed alarm for automobiles, the combination with a vehicle axle having a threaded prolongation and provided with a wheel mounted on the axle, of a bell-shaped casing constituting a sounding member and fixedly mounted on the threaded prolongation, a spider mounted on said threaded prolongation interior to the casing, a circular rack bar carried by the spider within the casing in surrounding relation to a portion of the hub of the wheel, a centrifugal member weighted at one end and at the other end provided with a hinge connection to the hub of the wheel, spring connections between the weighted end of the centrifugal member and the hub, a shaft mounted on the centrifugal member, a pinion fast to the shaft and movable with the centrifugal member into and out of mesh with the rack bar, and centrifugal tappets carried by and fast to the shaft and movable by the weighted member into operative relation to the casing.

9. In a speed alarm for automobiles, the combination with a vehicle axle having a threaded prolongation and provided with a wheel mounted on the axle, of a bell-shaped casing constituting a sounding member and fixedly mounted on the threaded prolongation, a spider mounted on said threaded prolongation interior to the casing, a circular rack bar carried by the spider within the casing in surrounding relation to a portion of the hub of the wheel, a centrifugal member weighted at one end and at the other end provided with a hinge connection to the hub of the wheel, spring connections between the weighted end of the centrifugal member and the hub, a shaft mounted on the centrifugal member, a pinion fast to the shaft and movable with the centrifugal member into and out of mesh with the rack bar, and centrifugal tappets carried by and fast to the shaft and movable by the weighted member into operative relation to the casing, said centrifugal member being provided with an arm prolongation extending to one side of the casing and having means for the attachment of a weight thereto.

In testimony, that I claim the foregoing as my own, I have hereto affixed my signature in the presence of two witnesses.

WILLIAM BLACKWELL CROSSLAND.

Witnesses:
A. J. FRAUENTHAL,
S. J. DENT.